US012693795B2

(12) United States Patent
Zhao et al.

(10) Patent No.: US 12,693,795 B2
(45) Date of Patent: Jul. 28, 2026

(54) METHOD, DEVICE, AND COMPUTER PROGRAM PRODUCT FOR ANOMALY DETECTION FOR STORAGE SYSTEM

(71) Applicant: Dell Products L.P., Round Rock, TX (US)

(72) Inventors: Xiaoliang Zhao, Roo (CN); Xianlong Liu, Shanghai (CN); Liang Huang, Shanghai (CN); Changyong Yu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/928,341

(22) Filed: Oct. 28, 2024

(65) Prior Publication Data

US 2025/0335106 A1     Oct. 30, 2025

(30) Foreign Application Priority Data

Apr. 26, 2024    (CN) .......................... 202410516909.6

(51) Int. Cl.
*G06F 11/07*          (2006.01)
*G06F 3/06*           (2006.01)
(52) U.S. Cl.
CPC .......... *G06F 3/0619* (2013.01); *G06F 3/0653* (2013.01); *G06F 3/0689* (2013.01)
(58) Field of Classification Search
CPC ..... G06F 3/0619; G06F 3/0653; G06F 3/0689
USPC ................................................... 714/6.1, 6.2
See application file for complete search history.

(56) References Cited

U.S. PATENT DOCUMENTS

| | | | |
|---|---|---|---|
| 11,036,215 B2 | 6/2021 | Cella et al. | |
| 11,199,837 B2 | 12/2021 | Cella et al. | |
| 2016/0098561 A1 | 4/2016 | Keller et al. | |
| 2018/0053401 A1 | 2/2018 | Martin et al. | |
| 2019/0385057 A1 | 12/2019 | Litichever et al. | |
| 2020/0285997 A1 | 9/2020 | Bhattacharyya et al. | |
| 2021/0208995 A1 | 7/2021 | De Abreu Pinho et al. | |
| 2022/0300366 A1 * | 9/2022 | Stoller ................ | G06F 11/3037 |
| 2023/0051212 A1 * | 2/2023 | Parry .................... | G06F 3/0619 |
| 2024/0143207 A1 * | 5/2024 | Vaideeswaran ........ | G11C 29/52 |

FOREIGN PATENT DOCUMENTS

WO      WO-2019006639 A1 *   1/2019 ............. G06F 3/067

* cited by examiner

*Primary Examiner* — Chae M Ko
(74) *Attorney, Agent, or Firm* — BainwoodHuang

(57) ABSTRACT

Techniques for anomaly detection for a storage system involve acquiring a plurality of attribute values of a plurality of volume data block entries. Such techniques further involve clustering a first portion of the plurality of volume data block entries into a homogeneous pool based on the plurality of attribute values of the plurality of volume data block entries. Such techniques further involve determining a second portion of the plurality of volume data block entries that are not clustered into the homogeneous pool as anomalous entries. In this way, the storage system can automatically filter out volume data block entries that may be anomalous, and thus can save time for troubleshooting, thereby increasing the efficiency of resolving system faults and improving the quality of service.

20 Claims, 9 Drawing Sheets

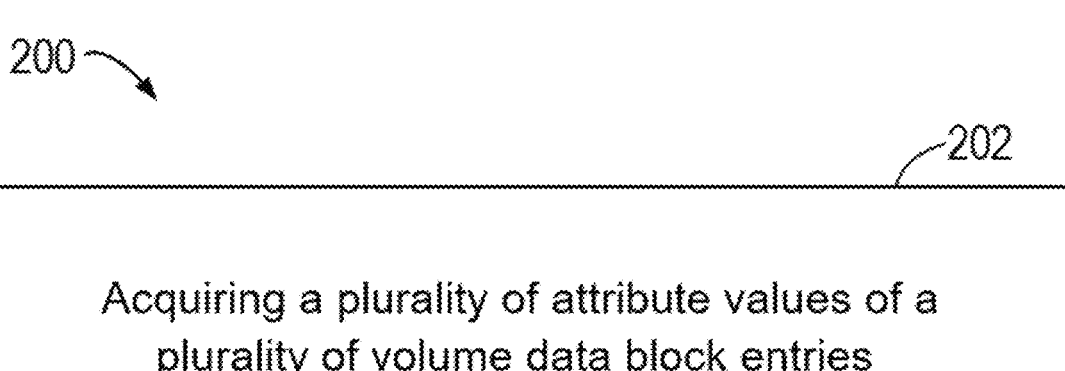

200

202

Acquiring a plurality of attribute values of a plurality of volume data block entries

204

Clustering a first portion of the plurality of volume data block entries into a homogeneous pool based on the plurality of attribute values of the plurality of volume data block entries

206

Determining a second portion of the plurality of volume data block entries that are not clustered into the homogeneous pool as anomalous entries

METHOD, DEVICE, AND COMPUTER PROGRAM PRODUCT FOR ANOMALY DETECTION FOR STORAGE SYSTEM

CROSS-REFERENCE TO RELATED APPLICATION

This application claims priority to Chinese Patent Application No. CN202410516909.6, on file at the China National Intellectual Property Administration (CNIPA), having a filing date of Apr. 26, 2024, and having "METHOD, DEVICE AND COMPUTER PROGRAM PRODUCT FOR ANOMALY DETECTION OF STORAGE SYSTEM" as a title, the contents and teachings of which are herein incorporated by reference in their entirety.

TECHNICAL FIELD

The present disclosure relates to the field of data storage and, more particularly, to a method, a device, and a computer program product for anomaly detection for a storage system.

BACKGROUND

Various anomalies may frequently occur in storage systems, which may be hardware faults, software errors, or data corruption. For example, corruption of a file system can cause data to be unreadable or unwritable, software or firmware defects may affect the normal operation of a storage device, software errors or hardware faults may cause data stored on a disk to potentially become inconsistent or corrupted, and the like.

System logs, which typically record information associated with hardware faults and software errors, are an important resource for diagnosing anomalies of a storage system. When an anomaly occurs in the storage system, a system administrator can access log records before or after the anomaly occurs and then look for an error or warning code in the log records. In some cases, if it is not possible to directly locate the position where the anomaly occurs through an error or warning code, an engineer with specialized knowledge is required to further analyze the details of the log to locate the problem.

SUMMARY OF THE INVENTION

In a first aspect of embodiments of the present disclosure, a method for anomaly detection for a storage system is provided. The method includes acquiring a plurality of attribute values of a plurality of volume data block entries. The method further includes clustering a first portion of the plurality of volume data block entries into a homogeneous pool based on the plurality of attribute values of the plurality of volume data block entries. In addition, the method further includes determining a second portion of the plurality of volume data block entries that are not clustered into the homogeneous pool as anomalous entries.

In a second aspect of the embodiments of the present disclosure, an electronic device is provided. The electronic device includes one or more processors; and a memory coupled to the at least one processor and having instructions stored thereon, wherein the instructions, when executed by the at least one processor, cause the electronic device to perform actions including acquiring a plurality of attribute values of a plurality of volume data block entries. The actions further include clustering a first portion of the plurality of volume data block entries into a homogeneous pool based on the plurality of attribute values of the plurality of volume data block entries. In addition, the actions further include determining a second portion of the plurality of volume data block entries that are not clustered into the homogeneous pool as anomalous entries.

In a third aspect of embodiments of the present disclosure, a computer program product is provided, the computer program product being tangibly stored on a non-volatile computer-readable medium and including machine-executable instructions, wherein the machine-executable instructions, when executed, cause a machine to implement a method for anomaly detection for a storage system. The method includes acquiring a plurality of attribute values of a plurality of volume data block entries. The method further includes clustering a first portion of the plurality of volume data block entries into a homogeneous pool based on the plurality of attribute values of the plurality of volume data block entries. In addition, the method further includes determining a second portion of the plurality of volume data block entries that are not clustered into the homogeneous pool as anomalous entries.

In a fourth aspect of embodiments of the present disclosure, a computer-readable storage medium is provided, which has a computer program stored thereon, wherein the program, when executed by a processor, implements a method for anomaly detection for a storage system. The method includes acquiring a plurality of attribute values of a plurality of volume data block entries. The method further includes clustering a first portion of the plurality of volume data block entries into a homogeneous pool based on the plurality of attribute values of the plurality of volume data block entries. In addition, the method further includes determining a second portion of the plurality of volume data block entries that are not clustered into the homogeneous pool as anomalous entries.

It should be understood that the content described in the Summary of the Invention part is neither intended to limit key or essential features of the embodiments of the present disclosure, nor intended to limit the scope of the present disclosure. Other features of the present disclosure will become readily understood from the following descriptions.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which:

FIG. 2 illustrates a flowchart of a method for anomaly detection for a storage system according to some embodiments of the present disclosure;

DETAILED DESCRIPTION

Figure 1:
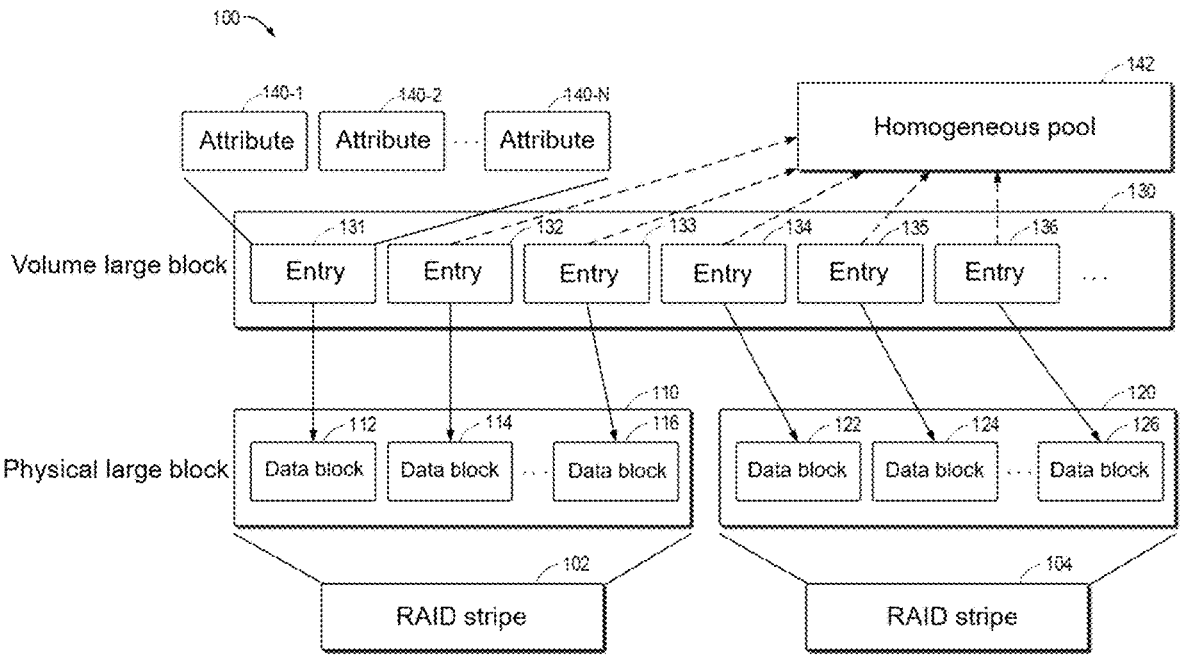
FIG. 1 illustrates a schematic diagram of an example storage system in which multiple embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the scope of protection of the present disclosure.

In the description of the embodiments of the present disclosure, the term "include" and similar terms thereof should be understood as open-ended inclusion, that is, "including but not limited to."The term "based on" should be understood as "based at least in part on." The term "an embodiment" or "the embodiment" should be understood as "at least one embodiment." The terms "first," "second," and the like may refer to different or the same objects. Other explicit and implicit implementations may also be included below.

As discussed above, for storage systems, a variety of system anomalies can occur on a daily basis, whether in a laboratory or at a customer site. These anomalies, if not detected and dealt with in a timely manner, can result in huge losses. For example, issues like data loss, system downtime, or drastic performance degradation can all seriously affect the efficiency of operation and quality of service of a business. Detecting faults caused by system anomalies and finding their root causes is a challenge for system administrators and engineers, and this process generally involves complex technical analysis and tedious debugging. In some cases, an engineer needs to add more debugging and tracking code to the system or reproduce the problems in specific test environments, so as to more accurately locate the problems.

In the related art, a storage system can record a large number of operation logs that record in detail every operation and state change of the system. When an anomaly occurs, the engineer needs to carefully analyze these log files to diagnose the root cause of the problem. This analysis process typically includes searching for error code, warning messages, records of failed operations, and any non-standard system responses. For example, if a file system suddenly fails to respond to a query request from a user, the engineer may need to check the log files of the file system to look for records of any anomalies related to input and output operations. With these records, the engineer can learn whether the problem is due to a resource lockup, data corruption, or a software defect. However, the process of locating the position where the anomaly occurred from a large number of log records not only requires the engineer to have a high level of technical skill, but is also very time-consuming.

To this end, embodiments of the present disclosure provide a scheme for anomaly detection for a storage system. In this scheme, volume data block entries associated with a physical data block in the storage system and a plurality of attribute values for the volume data block entries may be acquired. This scheme may then perform a clustering operation on a plurality of volume data block entries based on the plurality of attribute values of the volume data block entries. Most of these volume data block entries may be clustered into the same cluster, which is also referred to herein as a homogeneous pool. Those entries that are not clustered into the homogeneous pool can be determined as anomalous entries. The engineer can analyze these anomalous entries to determine the position where the problem or fault occurs.

In this way, the storage system can automatically filter out volume data block entries that may be anomalous, and the system administrator or engineer only needs to analyze the small number of anomalous entries that are filtered out to determine whether a fault has occurred in the vicinity of the corresponding physical data block. This can save the time spent on analyzing logs and debugging the system and improve the efficiency of locating anomalies, and thus can improve the efficiency of resolving system faults and improve the quality of service.

FIG. 1 illustrates a schematic diagram of an example storage system 100 in which multiple embodiments of the present disclosure can be implemented. The storage system may include a plurality of redundant arrays of independent disks (RAID) stripes, where each of the RAID stripes may correspond to one physical large block. The physical large block may be used to actually store data, and each physical large block may include a plurality of physical data blocks. The storage system may also include a plurality of virtual volume large blocks, wherein each of the volume large blocks may be associated with a plurality of physical large blocks, and each of the volume large blocks may include a plurality of volume data block entries, where each of the volume data block entries may correspond to one physical data block.

As shown in FIG. 1, the storage system 100 includes RAID stripes 102 and 104, where the RAID stripe 102 corresponds to a physical large block 110, and the RAID stripe 104 corresponds to a physical large block 120. The physical large block 110 includes physical data blocks 112, 114, and 116, and the physical large block 120 includes data blocks 122, 124, and 126. The storage system 100 further includes a volume large block 130, the volume large block 130 including volume data block entries 131, 132, 133, 134, 135, and 136, where the volume data block entry 131 corresponds to the physical data block 112, the volume data block entry 132 corresponds to the physical data block 114, the volume data block entry 133 corresponds to the physical data block 116, the volume data block entry 134 corresponds to physical data block 122, volume data block entry 135 corresponds to physical data block 124, and volume data block entry 136 corresponds to physical data block 126.

In the storage system 100, the volume data block entry may have a plurality of attributes. Taking the volume data block entry 131 as an example, it has attributes 140-1, 140-2, . . . , 140-N (collectively referred to as attributes 140). For example, the attributes 140 may include, but are not limited to, a location of a physical large block in which a corresponding physical data block is located, an offset of the corresponding physical data block in the physical large block, a size of the compressed physical data block, a checksum of data, a reference count of the physical data block, a type of the volume data block entry, and a subtype of the volume data block entry. The plurality of volume data block entries may have the same attributes, but for the same attribute, the plurality of volume data block entries may have different values.

In the scheme provided in embodiments of the present disclosure, the storage system 100 may cluster volume data block entries (e.g., including, but not limited to, volume data block entries 131, 132, 133, 134, 135, and 136) based on the attributes 140. Since most of the normal volume data block entries have relatively gentle differences between their attribute values, while the attribute values of the anomalous volume data block entries may have large variations compared with the attribute values of the normal volume data block entries, after clustering these volume data block entries based on the attribute values, most of the volume data block entries will be clustered into the same cluster (i.e., the homogeneous pool 142), while the volume data block entries that are not clustered into the homogeneous pool 142 may be determined to be anomalous entries. The storage system 100 may provide these anomalous entries to a system administrator in order to provide the system administrator with hints and clues for locating a system fault. For example, if the volume data block entry 131 is not clustered into the homogeneous pool 142, the storage system 100 may prompt that the volume data block entry 131 is an anomalous entry, and that the physical data block 112 corresponding to the volume data block entry 131 and physical data blocks in the vicinity of the physical data block 112 may be faulty.

In this way, the storage system 100 can automatically filter out volume data block entries that may be anomalous, and the system administrator only needs to analyze the small number of anomalous entries that are filtered out to determine whether a fault has occurred in the vicinity of the corresponding physical data block. This saves time in troubleshooting, and thus can improve the efficiency of resolving system faults and improve the quality of service.

FIG. 2 illustrates a flowchart of a method 200 for anomaly detection for a storage system according to some embodiments of the present disclosure. The method 200 may be performed, for example, by the storage system 100 or a control unit of the storage system 100 in FIG. 1. As shown in FIG. 2, at block 202, the method 200 may acquire a plurality of attribute values of a plurality of volume data block entries. For example, in the storage system 100 as shown in FIG. 1, volume data block entries 131, 132, 133, 134, 135, and 136 correspond to physical data blocks 112, 114, 116, 122, 124, and 126, respectively. Each of the volume data block entries includes a plurality of attributes 140, and the same attributes 140 of the plurality of volume data block entries may have different values. For example, assume that an attribute 140-1 indicates a data block entry type, which is an enumerated data structure and may have a value of 0, 1, 2, and so forth. At this point, the volume data block entries 131, 132, 133, 134, 135, and 136 all have the attribute 140-1 (i.e., the data block entry type), but the value of the attribute 140-1 of the volume data block entry 131 can be, for example, 0, the value of the attribute 140-1 of the volume data block entry 132 can be, for example, 1, and so forth. The storage system 100 may acquire values for the plurality of attributes 140 of the volume data block entries 131, 132, 133, 134, 135, and 136. In some embodiments, one vector may be used to denote a plurality of attribute values for one volume data block entry.

At block 204, the method 200 may cluster a first portion of the plurality of volume data block entries into a homogeneous pool based on the plurality of attribute values of the plurality of volume data block entries. Since most of the normal volume data block entries have relatively minor differences between their attribute values, while the attribute values of the anomalous volume data block entries may have large variations compared with the attribute values of the normal volume data block entries, after clustering these volume data block entries based on the attribute values, most of the volume data block entries will be clustered into the same cluster (also referred to as a homogeneous pool), and these volume data block entries are also referred to as the first portion. For example, in the storage system 100 as shown in FIG. 1, the volume data block entries 131, 132, 133, 134, 135, and 136 may be clustered based on the values of the plurality of attributes 140 of those volume data block entries. As shown in FIG. 1, after completing the clustering, the volume data block entries 132, 133, 134, 135, and 136 are clustered into the homogeneous pool 142, which indicates that the attribute values of these volume data block entries are similar. In other words, the distances between the attribute value vectors of the plurality of volume data block entries that are clustered into the homogeneous pool 142 are small. In some embodiments, the homogeneous pool is determined based on a computer algorithm during the process of clustering. In some embodiments, the homogeneous pool is determined based on the size of the generated cluster after the clustering of the plurality of volume data block entries. For example, after the clustering is completed, a cluster that includes most of the volume data block entries may be determined to be a homogeneous pool.

At block 206, the method 200 may determine a second portion of the plurality of volume data block entries that are not clustered into the homogeneous pool as anomalous entries. After the clustering is completed, if a portion of the volume data block entries (also known as the second portion) are not clustered into the homogeneous pool, their attribute values have large differences from the volume data block entries in the homogeneous pool. In other words, the distances between their attribute value vectors and the attribute value vectors of the volume data block entries in the homogeneous pool are large. Therefore, these volume data block entries that are not clustered into the homogeneous pool can be determined as anomalous entries. For example, in the storage system 100 shown in FIG. 1, the volume data block entry 131 is not clustered into the homogeneous pool 142, and it may then be determined as an anomalous entry, which indicates that the physical data block 112 corresponding to the volume data block entry 131 and physical data blocks in the vicinity of the physical data block 112 may be faulty. In some embodiments, the storage system 100 may provide the volume data block entries 131 to the system administrator to provide the system administrator with hints and clues for locating the system fault.

In this way, the storage system can automatically filter out volume data block entries that may be anomalous, and the system administrator only needs to analyze the small number of anomalous entries that are filtered out to determine whether a fault has occurred in the vicinity of the corresponding physical data block. This saves time in troubleshooting, and thus can improve the efficiency of resolving system faults and improve the quality of service.

Figure 3:
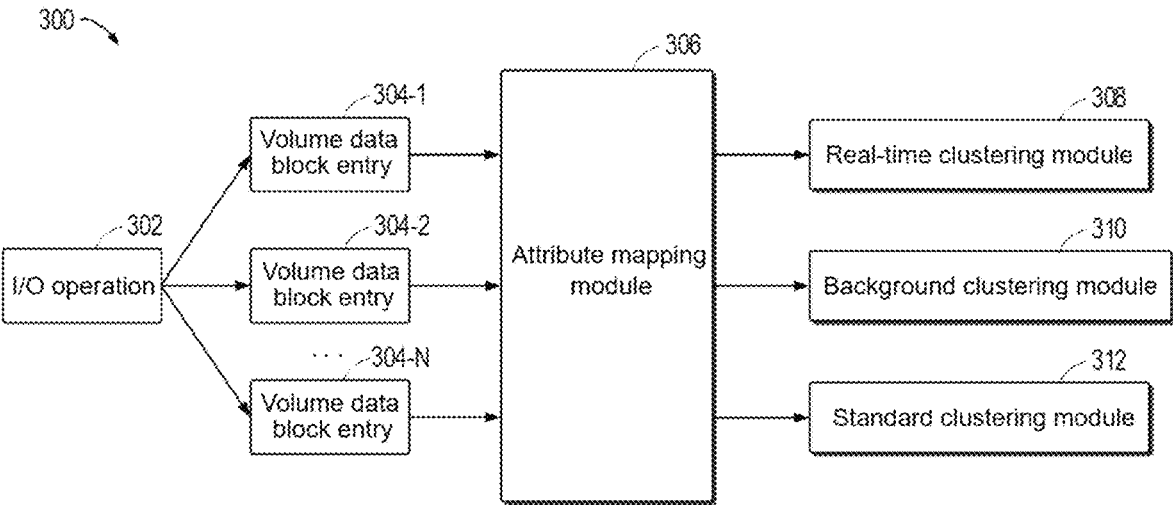
FIG. 3 illustrates a schematic diagram of an example architecture for anomaly detection according to some embodiments of the present disclosure.

FIG. 3 illustrates a schematic diagram of an example architecture 300 for anomaly detection according to some embodiments of the present disclosure. As shown in FIG. 3, after the storage system performs an input/output (I/O) operation 302, the architecture 300 may determine a plurality of volume data block entries 304-1, 304-2, . . . , and 304-N (collectively referred to as volume data block entries 304) associated with the I/O operation 302. For example, the architecture 300 may determine which physical data blocks the I/O operation 302 has performed operations on, and may then determine the volume data block entries 304 corresponding to those physical data blocks. It should be understood that the volume data block entries 304 may be from the same volume large block (e.g., the volume large block 130 as shown in FIG. 1) or from a plurality of volume large blocks. The architecture 300 may then acquire attribute values of the plurality of volume data block entries 304.

In some cases, the differences between a plurality of values of the same attribute are small, but different values can indicate completely different states or patterns. For example, for a Boolean type attribute, 0 and 1 have a small difference between them, but can indicate completely different states. For an enumerated type attribute, attribute values such as 1, 2, and 3 have small differences between them, but can indicate completely different patterns. Without special processing on these attribute values, volume data block entries with different attribute values are likely to be clustered together, which leads to an increase in the miss rate of anomalous entries. Therefore, in some embodiments, an attribute mapping module 306 may perform special processing on the values of the attributes having different data types to increase the differences between the different attribute values, which can increase the sensitivity of the clustering operation and reduce the miss rate.

In some embodiments, the plurality of volume data block entries include two volume data block entries (also referred to as a first volume data block entry and a second volume data block entry) that have different values for an attribute. In these embodiments, the attribute mapping module 306 may transform the value (also referred to as a first value) of that attribute of the first volume data block entry to a new value (also referred to as a third value) based on the type of that attribute. Additionally, the attribute mapping module 306 may also transform the value (also referred to as a second value) of that attribute of the second volume data block entry to a new value (also referred to as a fourth value) based on the type of that attribute, wherein the difference between the two transformed attribute values (i.e., the third value and the fourth value) is greater than the difference between the two original attribute values (i.e., the first value and the second value).

In some embodiments, for an enumerated type attribute, the following Equation (1) may be used to transform the original attribute values:

$$y = 10^x \tag{1}$$

where x denotes the original attribute value, and y denotes the transformed attribute value.

In some embodiments, for a Boolean type attribute, the following Equation (2) may be used to transform the original attribute values:

$$y = 100^x \tag{2}$$

where x denotes the original attribute value, and y denotes the transformed attribute value.

In some embodiments, for a numeric type attribute, the following Equation (3) may be used to transform the original attribute values:

$$y = \begin{pmatrix} x & x = 1 \\ 1000e^x & x \neq 1 \end{pmatrix} \tag{3}$$

where x denotes the original attribute value, e denotes a natural constant, and y denotes the transformed attribute value.

In some embodiments, the original attribute value may be kept unchanged for attributes of types other than the above types. By way of example, it is assumed that the volume data block entries 304-1 and 304-2 have the attribute "Type" of the enumerated type, the attribute "Entry Status" of the enumerated type, the attribute "Virtual Reference Count" of the numeric type, the attribute "Leaf Reference Count" of the numeric type, the attribute "Movement Status" of the Boolean type, and the attribute "Number of Virtual Data Blocks" of the numeric type.

In this example, it is assumed that the volume data block entry 304-1 has a value of 2 for "Type," a value of 1 for "Entry Status," a value of 0 for "Virtual Reference Count," a value of 0 for "Leaf Reference Count," a value of 0 for "Movement Status," and a value of 0 for "Number of Virtual Data Blocks," then the values of these attributes for the volume data block entry 304-1 can be represented as a vector as [2, 1, 0, 0, 0, 0]. In this example, it is assumed that the volume data block entry 304-2 has a value of 1 for "Type," a value of 0 for "Entry Status," a value of 1 for "Virtual Reference Count," a value of 1 for "Leaf Reference Count," a value of 1 for "Movement Status," and a value of 1 for "Number of Virtual Data Blocks," then the values of these attributes for the volume data block entry 304-2 can be represented as a vector as [1, 0, 1, 1, 1, 1]. At this point, the volume data block entries 304-1 and 304-2 represent two entries that are completely different, but the distance between their attribute value vectors is small, making it possible for them to be clustered into the same cluster.

After the attribute values of the volume data block entries 304-1 and 304-2 are transformed using the above Equations (1) to (3), the attribute values of the volume data block entry

304-1 can be transformed to [100, 10, 1000, 1000, 1, 1000], and the attribute values of the volume data block entry 304-2 can be transformed to [10, 1, 1, 1, 100, 1]. In this way, the difference between the attribute values can be increased, which can improve the sensitivity of the clustering operation and reduce the miss rate.

As shown in FIG. 3, when the attribute mapping module 306 transforms the attribute values of the volume data block entries 304, a real-time clustering module 308, a background clustering module 310, and a standard clustering module 312 can be used to cluster the volume data block entries 304. When the number of volume data block entries to be clustered is large, the efficiency of a clustering algorithm may be reduced. The real-time clustering module 308 may cluster incremental entries in real time upon receiving volume data block entries, the background clustering module 310 may periodically cluster a large number of volume data block entries in groups, and the standard clustering module 312 may cluster all volume data block entries when the number of volume data block entries is small. In this way, different clustering processes can be performed for different data volumes and timeliness requirements, which can improve the efficiency of the clustering process and increase the accuracy of clustering.

Figure 4:
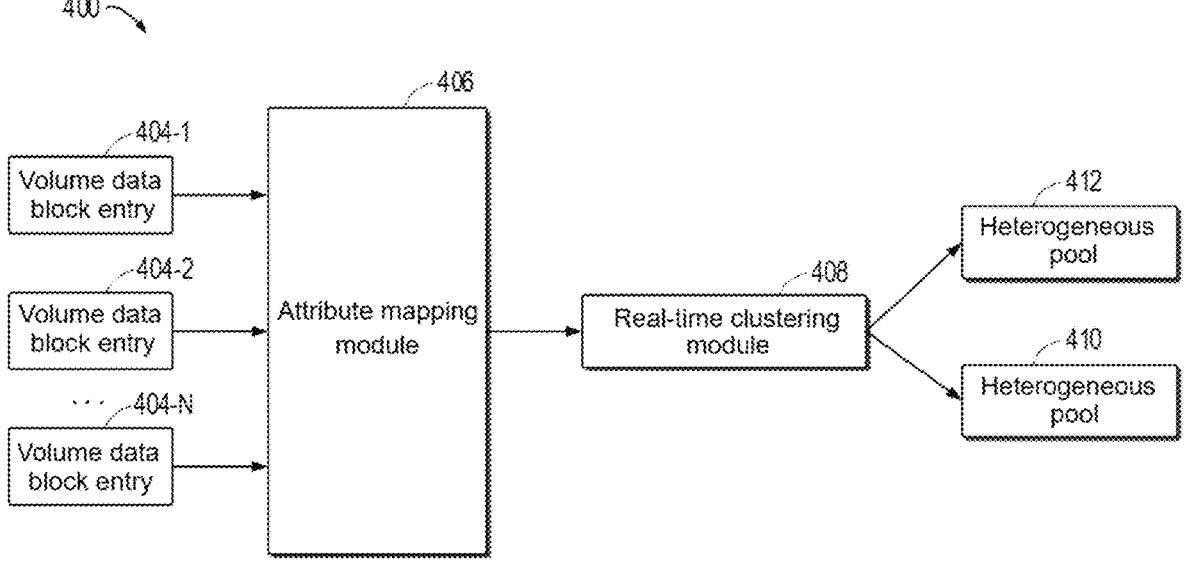
FIG. 4 illustrates a schematic diagram of an example for performing real-time clustering of volume data block entries to determine anomalous entries according to some embodiments of the present disclosure.

FIG. 4 illustrates a schematic diagram of an example 400 for performing real-time clustering of volume data block entries to determine anomalous entries according to some embodiments of the present disclosure. As shown in FIG. 4, the example 400 includes volume data block entries 404-1, 404-2, . . . , and 404-N (collectively referred to as volume data block entries 404). An attribute mapping module 406 (e.g., the attribute mapping module 306 as in the architecture 300 shown in FIG. 3) may transform the attribute values of the volume data block entries 404. The real-time clustering module 408 may then construct and determine a homogeneous pool 410 in real time in the process of receiving the volume data block entries 404, and after the homogeneous pool 410 has been determined, the real-time clustering module 408 may determine, based on the attribute values of the subsequent volume data block entries, whether or not those entries can be clustered into the homogeneous pool 410. If subsequent volume data block entries cannot be clustered into the homogeneous pool 410, the real-time clustering module 408 may place them into a heterogeneous pool 412, and the volume data block entries in the heterogeneous pool 412 may be determined as anomalous entries.

In some embodiments, when performing the real-time clustering process, one (also referred to as a first data block entry) of a plurality of volume data block entries may be determined as an anchor entry, and a candidate homogeneous pool may then be created based on the anchor entry. The homogeneous pool may then be determined based on the candidate homogeneous pool and a portion (also referred to as a third portion) of the plurality of volume data block entries. After determining the homogeneous pool, subsequent entries (also referred to as a fourth portion) in the plurality of volume data block entries may be clustered into the homogeneous pool based on a plurality of attribute values of those subsequent entries. In some embodiments, when determining the homogeneous pool based on the candidate homogeneous pool and a portion of the plurality of volume data block entries, an original density (also referred to as a first density) of the candidate homogeneous pool may be determined, where the original density is indicative of differences between the plurality of volume data block entries in the candidate homogeneous pool. A new density (also referred to as a second density) of the candidate homogeneous pool may then be determined if a new volume data block entry (also referred to as a second volume data block entry) is added to the candidate homogeneous pool. A density change for the candidate homogeneous pool may then be determined based on the original density and the new density of the candidate homogeneous pool, and the homogeneous pool may be determined based on that density change. In some embodiments, if the density change is greater than a predetermined density change threshold, the new volume data block entry may be added to the candidate homogeneous pool. If the number of volume data block entries in the candidate homogeneous pool is greater than a predetermined number threshold, the candidate homogeneous pool may be determined to be a homogeneous pool.

Figure 5:
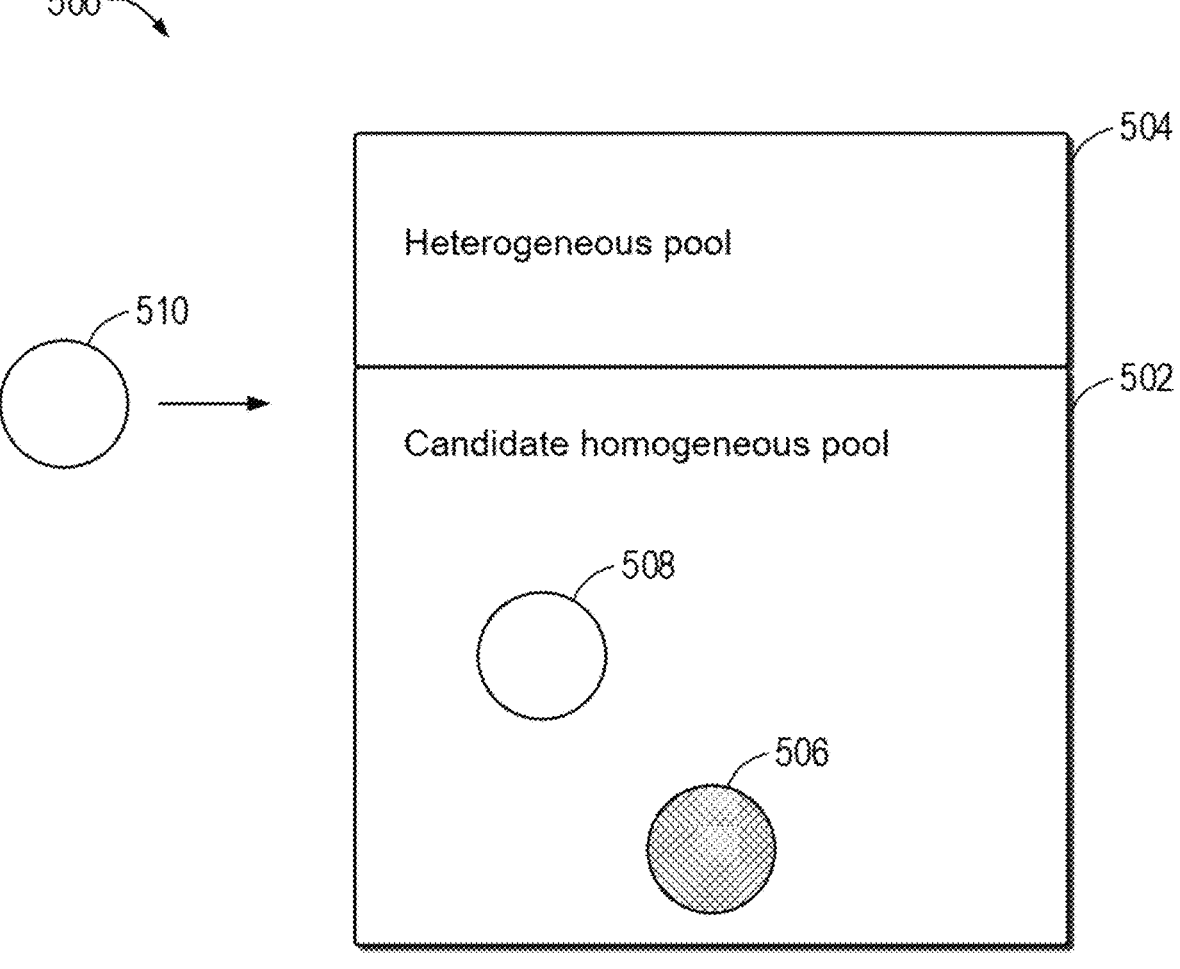
FIG. 5 illustrates a schematic diagram of an example process for determining a homogeneous pool in the case of real-time clustering according to some embodiments of the present disclosure.

FIG. 5 illustrates a schematic diagram of an example process 500 for determining a homogeneous pool in the case of real-time clustering according to some embodiments of the present disclosure. As shown in FIG. 5, in the process 500, the following Equation (4) may be used to define the density $\rho_{vlb}$ for a volume data block entry:

$$\rho_{vlb} = \left( \begin{array}{cc} \dfrac{1}{D_{vlb}} & D_{vlb} > 0 \\ 10 & D_{vlb} = 0 \end{array} \right) \quad (4)$$

where $D_{vlb}$ denotes a Euclidean distance from a volume data block entry to the anchor entry in the homogeneous pool. The Euclidean distance is a "straight line" distance measured between two points in Euclidean space. For the attribute value vector of the anchor entry and the attribute value vector of the volume data block entry, the two may both be represented as n-dimensional vectors with n attribute values. The Euclidean distance may be the square root of the sum of the squares of the differences in all the dimensions in the n-dimensional space, which indicates the shortest straight-line distance in that n-dimensional space from that volume data block entry to the anchor entry. After the transformation of the attribute values by the attribute mapping module, the minimum non-zero Euclidean distance between two volume data block entries is 1, i.e., the maximum density of that volume data block entry is 1. For volume data block entries with the same attribute values, the density can be set to 10 to better distinguish them from the case where two volume data block entries have different attribute values.

In addition, in the process 500, the following Equation (5) may also be used to define the density $\rho_p$ of the homogeneous pool:

$$\rho_p = \dfrac{N}{\sum_{i=1}^{N} \rho_{vlb}} \quad (5)$$

where N denotes the number of volume data block entries in the homogeneous pool.

Then, the following Equation (6) may be used to define the density change $\rho_\Delta$ of the homogeneous pool after new volume data block entries are added to the homogeneous pool:

$$\rho_\Delta = \left| \dfrac{\rho_p - \rho_{vlb}}{\rho_p} \right| \quad (6)$$

In the process 500, a real-time clustering module (e.g., the real-time clustering module 308 of FIG. 3) may sequentially receive volume data block entries 506, 508, and 510. The real-time clustering module may determine the first received volume data block entry 506 as an anchor entry. When the volume data block entry 508 is received, a distance $D_{vlb2}$ from it to the volume data block entry 506 may be determined, and based on $D_{vlb2}$, a density $\rho_{vlb2}$ of the volume data block entry 508 may be determined. At this point, the candidate homogeneous pool 502 includes volume data block entries 506 and 508, and the density $\rho_{vlb2}$ of the volume data block entry 508 may be determined as the density pp of the current candidate homogeneous pool 502.

In the process 500, $N_{as}$ may be used to denote the number of volume data block entries in the candidate homogeneous pool 502, and $N_{an}$ may be used to denote the number of volume data block entries in the heterogeneous pool 504. Further, $T_n$ may be used to denote a predetermined number threshold, and $T_\Delta$ may be used to denote a predetermined density change threshold.

When the real-time clustering module receives a new volume data block entry 510, it may determine its distance $D_{vlb3}$ to the anchor entry (i.e., the volume data block entry 506) and determine a density $\rho_{vlb3}$ of the volume data block entry 510 based on the distance $D_{vlb3}$. The density $\rho_{vlb3}$ can then be used to calculate the density change $\rho_\Delta$ of the candidate homogeneous pool 502 if the volume data block entry 510 is added to the candidate homogeneous pool 502. If the density change $\rho_\Delta$ is less than the predetermined density change threshold $T_\Delta$, the volume data block entry 510 may be added to the candidate homogeneous pool 502, and the number $N_{as}$ of volume data block entries in the candidate homogeneous pool 502 may be updated. If the density change $\rho_\Delta$ is greater than the density change threshold $T_\Delta$ and the density $\rho_p$ of the candidate homogeneous pool 502 is greater than the density $\rho_{vlb3}$, the volume data block entry 510 may be added to the heterogeneous pool 504, and the number $N_{an}$ of volume data block entries in the heterogeneous pool 504 may be updated.

If the number $N_{as}$ of volume data block entries in the candidate homogeneous pool 502 is greater than the predetermined number threshold $T_n$, the candidate homogeneous pool 502 may be determined to be a homogeneous pool (i.e., it may be considered that the homogeneous pool is ready) to be used for clustering of subsequent volume data block entries. In some embodiments, if the number $N_{an}$ of volume data block entries in the heterogeneous pool 504 is greater than another predetermined number threshold before the homogeneous pool is ready, it may be considered that the volume data block entries in the current candidate homogeneous pool 502 may be dissimilar from most of the entries, and thus the candidate homogeneous pool 502 and the heterogeneous pool 504 may be emptied, and a new anchor entry may be re-determined. The above process may then be repeated until the candidate homogeneous pool 502 is determined to be a homogeneous pool. In this way, it is possible to determine the homogeneous pool in real time while receiving new volume data block entries, without waiting for a large number of volume data block entries to be received before performing a clustering operation on them, which can improve the efficiency of determining the homogeneous pool.

In some embodiments, after determining the homogeneous pool, a density change of the homogeneous pool may be determined if a subsequent volume data block entry (also referred to as a third volume data block entry) of the plurality of volume data block entries is added to the homogeneous pool. If the density change of the homogeneous pool is greater than the predetermined density change threshold, the volume data block entry may be determined to be an anomalous entry. In some embodiments, after determining the homogeneous pool, the number (also referred to as a first number) of volume data block entries that are subsequently clustered into the homogeneous pool and the number (also referred to as a second number) of volume data block entries that are not clustered into the homogeneous pool may be determined. If the ratio of the first number to the second number is less than a predetermined ratio threshold, a new homogeneous pool may be re-established by selecting a new anchor entry.

Figure 6:
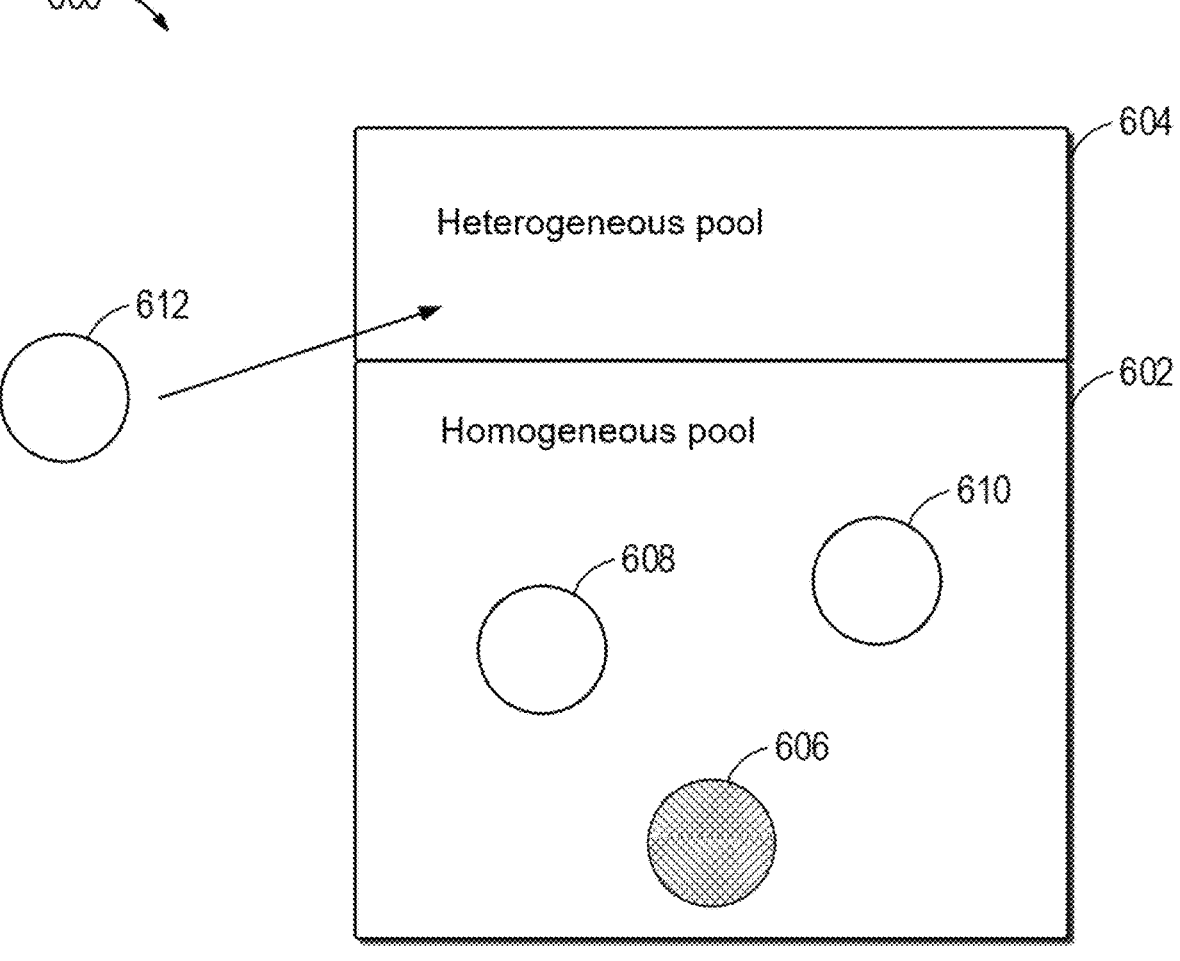
FIG. 6 illustrates a schematic diagram of an example process for determining an anomalous entry after determining the homogeneous pool in the case of real-time clustering according to some embodiments of the present disclosure.

FIG. 6 illustrates a schematic diagram of an example process 600 for determining an anomalous entry after determining the homogeneous pool in the case of real-time clustering according to some embodiments of the present disclosure. As shown in FIG. 6, in the process 600, a homogeneous pool 602 is a ready homogeneous pool (e.g., a homogeneous pool determined through the process 500) that includes volume data block entries 606, 608, and 610, wherein the volume data block entry 606 is an anchor entry. Upon receiving the volume data block entry 612, a distance from the volume data block entry 612 to the anchor entry (i.e., the volume data block entry 606) and the density change of the homogeneous pool 602 if the volume data block entry 612 is added to the homogeneous pool 602 may be determined. If the density change is greater than a predetermined density change threshold, the volume data block entry 612 may be added to the heterogeneous pool 604.

In some embodiments, the real-time clustering module may determine the number of volume data block entries that are added to the heterogeneous pool 604 after the homogeneous pool 602 has been determined. If this number is greater than a predetermined number threshold, it can be considered that the volume data block entries in the previously determined homogeneous pool 602 may be dissimilar from most of the volume data block entries, and thus a new homogeneous pool can be re-established by selecting a new anchor entry. In this manner, erroneous homogeneous pools can be discarded and correct homogeneous pools can be re-established in a timely manner, which can improve the accuracy of real-time clustering.

In some embodiments, volume data block entries that are added to the homogeneous pool 602 after the homogeneous pool 602 has been determined may also be determined. If, after the homogeneous pool 602 has been determined, the ratio of the number of entries that have been added to the homogeneous pool 602 to the number of entries that have been added to the heterogeneous pool 604 is less than a predetermined ratio threshold, it can be considered that the volume data block entries in the previously determined homogeneous pool 602 may be dissimilar from most of the volume data block entries, and thus a new homogeneous pool can be re-established by selecting a new anchor entry. In this way, it is possible to improve the accuracy of determining whether the homogeneous pool 602 has been established correctly or incorrectly.

In some cases, in order to find missed anomalous entries, background clustering can be performed periodically on a large number of volume data block entries from a past period of time. In performing the background clustering, in some embodiments, a total number of a plurality of volume data block entries may be determined. If the total number is greater than a predetermined total number threshold (also referred to as a first predetermined total number threshold), the plurality of volume data block entries may be split into a first group of volume data block entries and a second group of volume data block entries. Anomalous entries in the first group of volume data block entries and anomalous entries in the second group of volume data block entries may then be detected in parallel. In some embodiments, when determining the anomalous entries in the first group of volume data block entries, the first group of volume data block entries may be split into a third group of volume data block entries and a fourth group of volume data block entries. Then, anomalous entries in the third group of volume data block entries and anomalous entries in the fourth group of volume data block entries may be detected serially.

Figure 7:
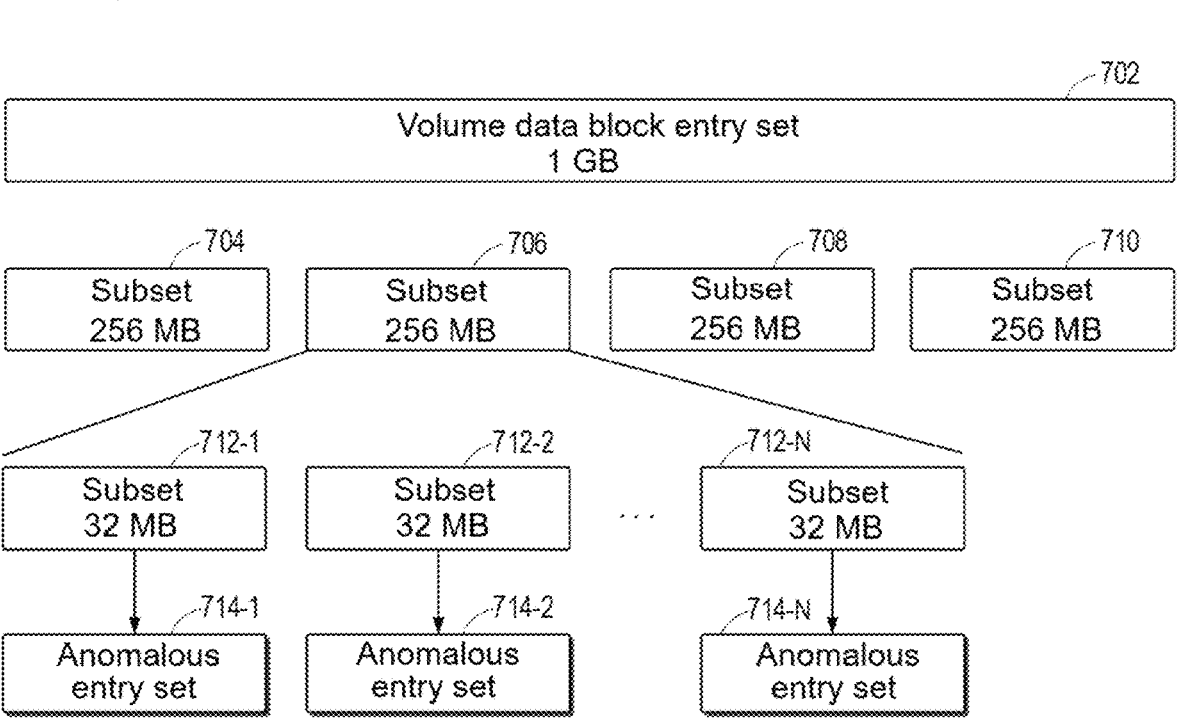
FIG. 7 illustrates a schematic diagram of an example process for grouping volume data block entries in the case of background clustering according to some embodiments of the present disclosure.

FIG. 7 illustrates a schematic diagram of an example process 700 for grouping volume data block entries in the case of background clustering according to some embodiments of the present disclosure. As shown in FIG. 7, in the process 700, background clustering needs to be performed on a volume data block entry set 702 corresponding to 1 GB of physical data blocks. Assuming that each physical data block is 4 KB in size, the volume data block entry set 702 would include approximately 250,000 volume data block entries, and performing a clustering operation on such a large number of entries would be very time-consuming. Accordingly, if the size of the volume data block entry set 702 is larger than a predetermined total number threshold, it can be split into subsets 704, 706, 708, and 710, and each subset can, for example, correspond to 256 MB of physical data blocks. The clustering operation can then be performed on the subsets 704, 706, 708, and 710 in parallel, which can improve the efficiency of the execution of the clustering algorithm and save the time used to execute the clustering algorithm.

As shown in FIG. 7, the process 700 may also continue to perform splitting for each of the subsets 704, 706, 708, and 710. For example, the process 700 may split the subset 706 into subsets 712-1, 712-2, . . . , 712-N (collectively referred to as subsets 712), where each of the subsets 712 may, for example, correspond to 32 MB of physical data blocks. The clustering algorithm may then be executed separately for each subset 712. However, performing the clustering algorithm on these subsets 712, while increasing the efficiency of the execution of the algorithm, may reduce the accuracy and credibility of the clustering. Accordingly, the process 700 may perform the clustering algorithm serially for the plurality of subsets 712 and adjust the volume data block entries in subsequent subsets based on the clustering results of the prior subsets, thereby enabling a clustering process that can be dynamically adjusted.

As shown in FIG. 7, the process 700 may first perform the clustering algorithm on the subset 712-1 and determine anomalous entry set 714-1. If the anomalous entry set 714-1 satisfies a predetermined condition, it may be assumed that there may be a problem with the accuracy of the anomalous entry set 714-1. Then, by adjusting the volume data block entries in the next subset 712-2, the process 700 may attempt to find anomalous entries that were false alarmed or missed. The process 700 may then determine the union of anomalous entries sets 714-1, 714-2, . . . , and 714-N as the anomalous entry set for the subset 706, and the union of anomalous entry sets for the subsets 704, 706, 708, and 710 as the anomalous entry set for the volume data block entry set 702.

In some embodiments, when serially detecting the anomalous entries in the third group of volume data block entries and the anomalous entries in the fourth group of volume data block entries, the number of the anomalous entries in the third group of volume data block entries may be determined.

If the number of the anomalous entries in the third group of volume data block entries is less than a predetermined anomaly number threshold, a portion of entries in the third group of volume data block entries may be added to the fourth group of volume data block entries. Anomalous entries in the updated fourth group of volume data block entries may then be detected.

Figure 8:
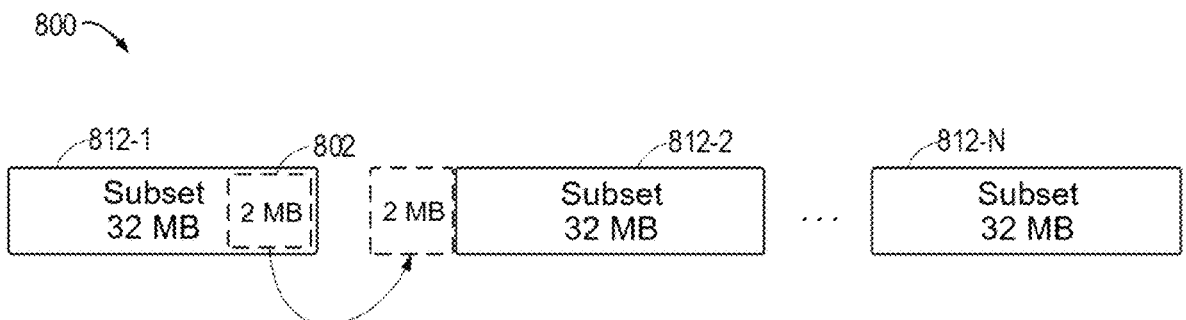
FIG. 8 illustrates a schematic diagram of an example process for adding a portion of a previous group of volume data block entries to another group of volume data block entries to determine an anomalous entry in the case of background clustering according to some embodiments of the present disclosure.

FIG. 8 illustrates a schematic diagram of an example process 800 for adding a portion of a previous group of volume data block entries to another group of volume data block entries to determine an anomalous entry in the case of background clustering according to some embodiments of the present disclosure. As shown in FIG. 800, the process 800 includes volume data block entry subsets 812-1, 812-2, . . . , and 812-N (collectively referred to as subsets 812, which may be, for example, the subsets 712 in FIG. 7), wherein each subset 812 may correspond to 32 MB of physical data blocks. The process 800 may first perform a clustering algorithm on the subset 812-1 to determine anomalous entries therein. If the number of anomalous entries in the subset 812-1 is less than a predetermined anomaly number threshold (e.g., 1, 3, 5, and so on), in order to verify that the entries in the homogeneous pool for the subset 812-1 are not anomalous relative to the other subsets, the process 800 may add a portion 802 (e.g., 2 MB) of the subset 812-1 to the next subset 812-2. At this point, the subset 812-2 includes volume data block entries corresponding to 34 MB of physical data blocks, 2 MB of which are from the subset 812-1.

The process 800 may then perform a clustering algorithm on the subset 812-2. After clustering the subset 812-2, if anomalous entries are detected in the portion 802, it indicates that the subset 812-1 may include a high number of anomalous entries. At this point, it is possible to locate the volume data block entries in the subset 812-1 through the detected anomalous entries in the portion 802, and thus it is possible to further confirm whether or not the entries in the subset 812-1 that were previously determined to be normal entries are actually anomalous entries.

In this way, the amount of data involved each time the clustering algorithm is executed can be reduced, and thus the efficiency of the execution of the clustering algorithm can be improved. In addition, it is also possible to verify the clustering results, thereby enabling improvement of the accuracy of the anomaly detection.

In some cases, when the total number of volume data block entries that need to be detected is small (e.g., in the case of functional testing), standard clustering can be performed on those entries. When performing the standard clustering, a density-based spatial clustering (DBSCAN) algorithm may be used to cluster volume data block entries.

In the standard clustering, one volume data block entry can be considered as the neighborhood of another volume data block entry, and the maximum distance between these two volume data block entries can be controlled by the parameter Epsilon, where Epsilon is used to define the radius of the neighborhood around each point. After transforming the attribute values of the volume data block entries, the minimum distance between two different volume data block entries with different attribute meanings is 10, so Epsilon can be set to 10 for the first attempt. The number of samples (or total weight) in the neighborhood of an anchor entry considered as a core point can be controlled by the parameter MIN_SAMPLES, and it can be set to twice the number of attributes of the volume data block entries used for clustering. These two key parameters can be adjusted in different ways to obtain different clustering results.

Utilizing the DBSCAN algorithm to perform standard clustering can have a variety of advantages, for example, DBSCAN can identify clusters with arbitrary shapes, which allows DBSCAN to excel in complex datasets and discover clusters with nonlinear distributions. In addition, due to the density-based clustering approach, DBSCAN performs well in datasets with large data density variations, and can differentiate between regions of high and low density to form clusters. In addition to this, DBSCAN can effectively recognize and process noisy data and outliers (i.e., anomalous entries). This is because the algorithm only defines regions with sufficiently high density as clusters (i.e., homogeneous pools), while points with low density are labeled as noise. In this way, standard clustering can result in clustering results with higher accuracy in an acceptable amount of time.

Figure 9:
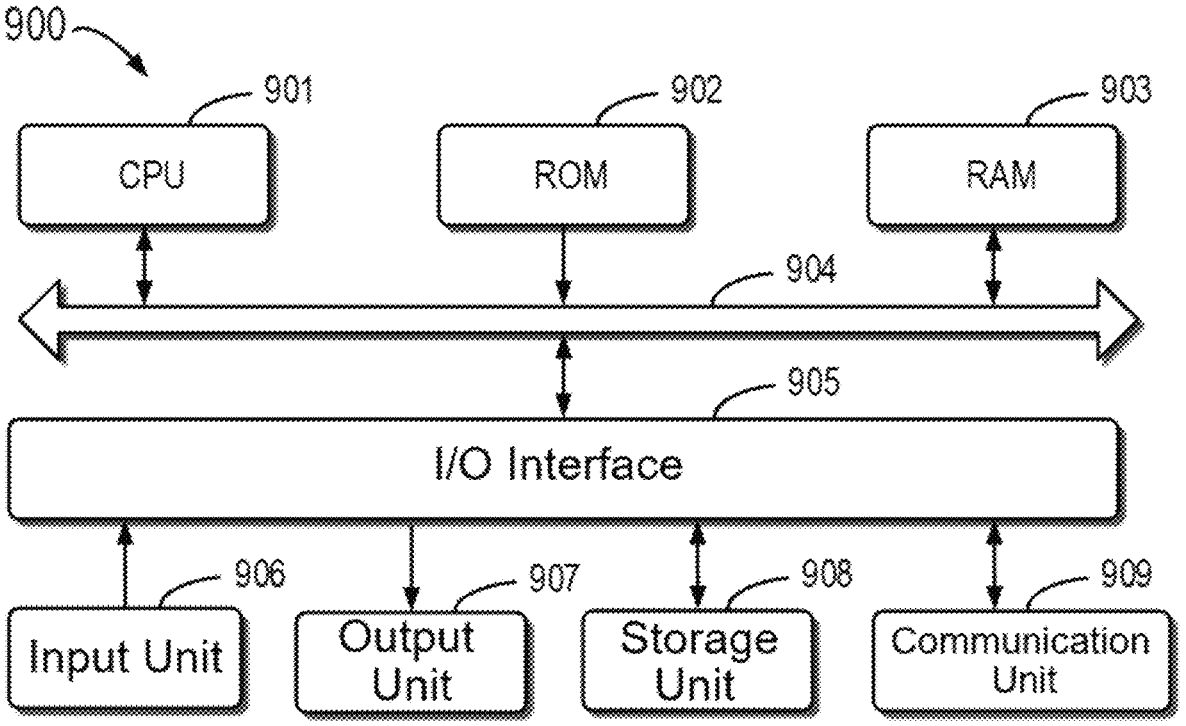
FIG. 9 illustrates a block diagram of a device that can implement a plurality of embodiments of the present disclosure.

FIG. 9 illustrates a schematic block diagram of an example device 900 which can be used to implement embodiments of the present disclosure. For example, the control unit of the storage system 100 shown in FIG. 1 may be an example device 900 as shown in FIG. 9. As illustrated in the figure, the device 900 includes a computing unit 901 that can execute various appropriate actions and processing according to computer program instructions stored in a read-only memory (ROM) 902 or computer program instructions loaded from a storage unit 908 to a random access memory (RAM) 903. Various programs and data required for the operation of the device 900 may also be stored in the RAM 903. The computing unit 901, the ROM 902, and the RAM 903 are connected to each other through a bus 904. An input/output (I/O) interface 905 is also connected to the bus 904.

A plurality of components in the device 900 are connected to the I/O interface 905 and include: an input unit 906, such as a keyboard and a mouse; an output unit 907, such as various types of displays and speakers; the storage unit 908, such as a magnetic disk and an optical disc; and a communication unit 909, such as a network card, a modem, and a wireless communication transceiver. The communication unit 909 allows the device 900 to exchange information/data with other devices via a computer network, such as the Internet, and/or various telecommunication networks.

The computing unit 901 may be various general-purpose and/or special-purpose processing components with processing and computing capabilities. Some examples of the computing unit 901 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. The computing unit 901 performs various methods and processes described above, such as the method 200. For example, in some embodiments, the method 200 may be implemented as a computer software program that is tangibly included in a machine-readable medium, such as the storage unit 908. In some embodiments, part or all of the computer program may be loaded and/or installed onto the device 900 via the ROM 902 and/or the communication unit 909. When the computer program is loaded to the RAM 903 and executed by the computing unit 901, one or more steps of the method 200 described above may be performed. Alternatively, in other embodiments, the computing unit 901 may be configured to implement the method 200 in any other suitable manners (such as by means of firmware).

The functions described hereinabove may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program code for implementing the method of the present disclosure may be written by using one programming language or any combination of multiple programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method for anomaly detection for a storage system, comprising:

acquiring a plurality of attribute values of a plurality of volume data block entries;

clustering a first portion of the plurality of volume data block entries into a homogeneous pool based on the plurality of attribute values of the plurality of volume data block entries; and determining a second portion of the plurality of volume data block entries that are not clustered into the homogeneous pool as anomalous entries.

2. The method according to claim 1, wherein the plurality of attribute values of the plurality of volume data block entries comprise a first value of an attribute of a first volume data block entry and a second value of the attribute of a second volume data block entry, and clustering the first portion of the plurality of volume data block entries into the homogeneous pool based on the plurality of attribute values of the plurality of volume data block entries comprises:

transforming the first value to a third value based on a type of the attribute;

transforming the second value to a fourth value based on the type of the attribute, wherein a difference between the third value and the fourth value is greater than a difference between the first value and the second value; and clustering one or both of the first volume data block entry and the second volume data block entry into the homogeneous pool based on the third value and the fourth value.

3. The method according to claim 1, wherein clustering the first portion of the plurality of volume data block entries into the homogeneous pool based on the plurality of attribute values of the plurality of volume data block entries comprises:

determining a first volume data block entry of the plurality of volume data block entries as an anchor entry;

creating a candidate homogeneous pool based on the anchor entry;

determining the homogeneous pool based on the candidate homogeneous pool and a third portion of the plurality of volume data block entries; and clustering a fourth portion of the plurality of volume data block entries into the homogeneous pool based on a plurality of attribute values of the fourth portion, wherein the first portion comprises the fourth portion and at least part of the third portion.

4. The method according to claim 3, wherein determining the homogeneous pool based on the candidate homogeneous pool and the third portion of the plurality of volume data block entries comprises:

determining a first density of the candidate homogeneous pool, the first density being indicative of a difference between a plurality of volume data block entries in the candidate homogeneous pool;

determining a second density of the candidate homogeneous pool if a second volume data block entry in the third portion is added to the candidate homogeneous pool;

determining, based on the first density and the second density of the candidate homogeneous pool, a density change of the candidate homogeneous pool if the second volume data block entry is added to the candidate homogeneous pool; and determining the homogeneous pool based on the density change of the candidate homogeneous pool.

5. The method according to claim 4, wherein determining the homogeneous pool based on the density change of the candidate homogeneous pool comprises:

adding the second volume data block entry to the candidate homogeneous pool in response to the density change being greater than a predetermined density change threshold; and determining the candidate homogeneous pool as the homogeneous pool in response to a number of volume data block entries in the candidate homogeneous pool being greater than a predetermined number threshold.

6. The method according to claim 3, wherein determining the second portion of the plurality of volume data block entries that is not clustered into the homogeneous pool as anomalous entries comprises:

determining, after determining the homogeneous pool, a density change of the homogeneous pool if a third volume data block entry of the plurality of volume data block entries is added to the homogeneous pool; and determining the third volume data block entry as an anomalous entry in response to the density change of the homogeneous pool being greater than a predetermined density change threshold.

7. The method according to claim 6, further comprising:

determining, after determining the homogeneous pool, a first number of volume data block entries that are subsequently clustered into the homogeneous pool and a second number of volume data block entries that are not clustered into the homogeneous pool; and re-establishing a new homogeneous pool by selecting a new anchor entry in response to a ratio of the first number to the second number being less than a predetermined ratio threshold.

8. The method according to claim 1, further comprising:

determining a total number of the plurality of volume data block entries;

splitting the plurality of volume data block entries into a first group of volume data block entries and a second group of volume data block entries in response to the total number being greater than a first predetermined total number threshold; and detecting in parallel anomalous entries in the first group of volume data block entries and anomalous entries in the second group of volume data block entries.

9. The method according to claim 8, wherein detecting in parallel the anomalous entries in the first group of volume data block entries and the anomalous entries in the second group of volume data block entries comprises:

splitting the first group of volume data block entries into a third group of volume data block entries and a fourth group of volume data block entries; and detecting serially anomalous entries in the third group of volume data block entries and anomalous entries in the fourth group of volume data block entries.

10. The method according to claim 9, wherein detecting serially the anomalous entries in the third group of volume data block entries and the anomalous entries in the fourth group of volume data block entries comprises:

determining the number of the anomalous entries in the third group of volume data block entries;

adding a portion of entries in the third group of volume data block entries to the fourth group of volume data block entries in response to the number of the anomalous entries in the third group of volume data block entries being less than a predetermined anomaly number threshold; and detecting anomalous entries in the fourth group of volume data block entries.

11. An electronic device, comprising:

at least one processor; and a memory coupled to the at least one processor and having instructions stored thereon, the instructions, when executed by the at least one processor, causing the electronic device to perform actions comprising:

acquiring a plurality of attribute values of a plurality of volume data block entries;

clustering a first portion of the plurality of volume data block entries into a homogeneous pool based on the plurality of attribute values of the plurality of volume data block entries; and determining a second portion of the plurality of volume data block entries that are not clustered into the homogeneous pool as anomalous entries.

12. The device according to claim 11, wherein the plurality of attribute values of the plurality of volume data block entries comprise a first value of an attribute of a first volume data block entry and a second value of the attribute of a second volume data block entry, and clustering the first portion of the plurality of volume data block entries into the homogeneous pool based on the plurality of attribute values of the plurality of volume data block entries comprises:

transforming the first value to a third value based on a type of the attribute;

transforming the second value to a fourth value based on the type of the attribute, wherein a difference between the third value and the fourth value is greater than a difference between the first value and the second value; and clustering one or both of the first volume data block entry and the second volume data block entry into the homogeneous pool based on the third value and the fourth value.

13. The device according to claim 11, wherein clustering the first portion of the plurality of volume data block entries into the homogeneous pool based on the plurality of attribute values of the plurality of volume data block entries comprises:

determining a first volume data block entry of the plurality of volume data block entries as an anchor entry;

creating a candidate homogeneous pool based on the anchor entry;

determining the homogeneous pool based on the candidate homogeneous pool and a third portion of the plurality of volume data block entries; and clustering a fourth portion of the plurality of volume data block entries into the homogeneous pool based on a plurality of attribute values of the fourth portion, wherein the first portion comprises the fourth portion and at least part of the third portion.

14. The device according to claim 13, wherein determining the homogeneous pool based on the candidate homogeneous pool and the third portion of the plurality of volume data block entries comprises:

determining a first density of the candidate homogeneous pool, the first density being indicative of a difference between a plurality of volume data block entries in the candidate homogeneous pool;

determining a second density of the candidate homogeneous pool if a second volume data block entry in the third portion is added to the candidate homogeneous pool;

determining, based on the first density and the second density of the candidate homogeneous pool, a density change of the candidate homogeneous pool if the second volume data block entry is added to the candidate homogeneous pool; and determining the homogeneous pool based on the density change of the candidate homogeneous pool.

15. The device according to claim 14, wherein determining the homogeneous pool based on the density change of the candidate homogeneous pool comprises:

adding the second volume data block entry to the candidate homogeneous pool in response to the density change being greater than a predetermined density change threshold; and determining the candidate homogeneous pool as the homogeneous pool in response to a number of volume data block entries in the candidate homogeneous pool being greater than a predetermined number threshold.

16. The device according to claim 13, wherein determining the second portion of the plurality of volume data block entries that is not clustered into the homogeneous pool as anomalous entries comprises:

determining, after determining the homogeneous pool, a density change of the homogeneous pool if a third volume data block entry of the plurality of volume data block entries is added to the homogeneous pool; and determining the third volume data block entry as an anomalous entry in response to the density change of the homogeneous pool being greater than a predetermined density change threshold.

17. The device according to claim 16, wherein the actions further comprise:

determining, after determining the homogeneous pool, a first number of volume data block entries that are subsequently clustered into the homogeneous pool and a second number of volume data block entries that are not clustered into the homogeneous pool; and re-establishing a new homogeneous pool by selecting a new anchor entry in response to a ratio of the first number to the second number being less than a predetermined ratio threshold.

18. The device according to claim 11, wherein the actions further comprise:

determining a total number of the plurality of volume data block entries;

splitting the plurality of volume data block entries into a first group of volume data block entries and a second group of volume data block entries in response to the total number being greater than a first predetermined total number threshold; and detecting in parallel anomalous entries in the first group of volume data block entries and anomalous entries in the second group of volume data block entries.

19. The device according to claim 18, wherein detecting in parallel the anomalous entries in the first group of volume data block entries and the anomalous entries in the second group of volume data block entries comprises:

splitting the first group of volume data block entries into a third group of volume data block entries and a fourth group of volume data block entries; and detecting serially anomalous entries in the third group of volume data block entries and anomalous entries in the fourth group of volume data block entries.

20. A computer program product having a non-transitory computer readable medium which stores a set of instructions to perform anomaly detection for a storage system; the set of instructions, when carried out by computerized circuitry, causing the computerized circuitry to perform a method of:

acquiring a plurality of attribute values of a plurality of volume data block entries;

clustering a first portion of the plurality of volume data block entries into a homogeneous pool based on the plurality of attribute values of the plurality of volume data block entries; and determining a second portion of the plurality of volume data block entries that are not clustered into the homogeneous pool as anomalous entries.

\*  \*  \*  \*  \*